(12) United States Patent
Moch et al.

(10) Patent No.: US 9,346,128 B2
(45) Date of Patent: May 24, 2016

(54) METHOD FOR PRODUCING A PATTERN OF DEPRESSIONS IN THE FRICTION SURFACE OF A FRICTION COMPONENT AND A FRICTION COMPONENT FOR A FRICTIONALLY OPERATING DEVICE HAVING SUCH A PATTERN OF DEPRESSIONS

(75) Inventors: Ludwig Hermann Moch, Kronau (DE); Norbert Bastel, Ober-Rheinhausen (DE); Erik Sulzer, Lambsheim (DE)

(73) Assignee: BorgWarner Inc., Auburn Hills, MI (US)

( * ) Notice: Subject to any disclaimer, the term of this patent is extended or adjusted under 35 U.S.C. 154(b) by 906 days.

(21) Appl. No.: 13/527,938

(22) Filed: Jun. 20, 2012

(65) Prior Publication Data

US 2013/0004717 A1 Jan. 3, 2013

(30) Foreign Application Priority Data

Jun. 30, 2011 (DE) .......................... 10 2011 106 009

(51) Int. Cl.
*B23K 26/36* (2014.01)
*F16D 69/00* (2006.01)
*F16D 13/64* (2006.01)

(52) U.S. Cl.
CPC ............. *B23K 26/365* (2013.01); *B23K 26/362* (2013.01); *F16D 13/648* (2013.01); *F16D 69/00* (2013.01); *B23K 2201/006* (2013.01); *F16D 2069/004* (2013.01); *Y10T 29/49995* (2015.01); *Y10T 428/24479* (2015.01)

(58) Field of Classification Search
CPC ........... B23K 26/365; B23K 2201/006; B23K 36/362; Y10T 29/49995; Y10T 428/24479; F16D 69/00; F16D 2069/004; F16D 13/648
See application file for complete search history.

(56) References Cited

U.S. PATENT DOCUMENTS 6,013,696 A * 1/2000 Hill et al. ...................... 523/149

FOREIGN PATENT DOCUMENTS

| DE | 3049325 A1 | 7/1982 |
|---|---|---|
| DE | 8316745 U1 | 10/1983 |
| DE | 4231678 A1 | 4/1993 |
| DE | 19614268 C1 | 8/1997 |
| DE | 19714563 C1 | 8/1998 |
| DE | 69526942 T2 | 2/2003 |
| DE | 102006045456 A1 | 4/2008 |
| EP | 0969219 A2 | 1/2000 |
| EP | 2236851 A1 | 10/2010 |
| JP | 2010-112459 * | 5/2010 |

* cited by examiner

*Primary Examiner* — Mathieu Vargot
(74) *Attorney, Agent, or Firm* — BrooksGroup

(57) ABSTRACT

A method for producing a pattern of depressions in the friction surface of a friction component for a frictionally operating device, preferably a multiplate clutch or multiplate brake. After the preparation of the friction component, the pattern of depressions is produced by nontraditional material removal, removal of material preferably being accomplished in a contactless manner, particularly preferably with the aid of a laser beam.

6 Claims, 4 Drawing Sheets

Figure 1:
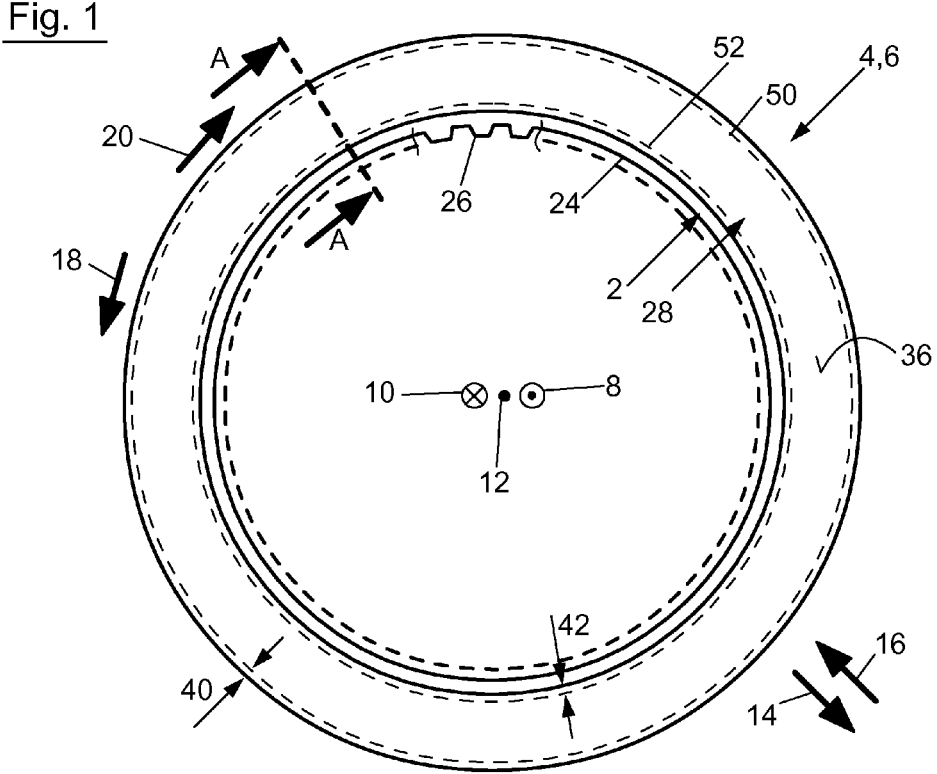

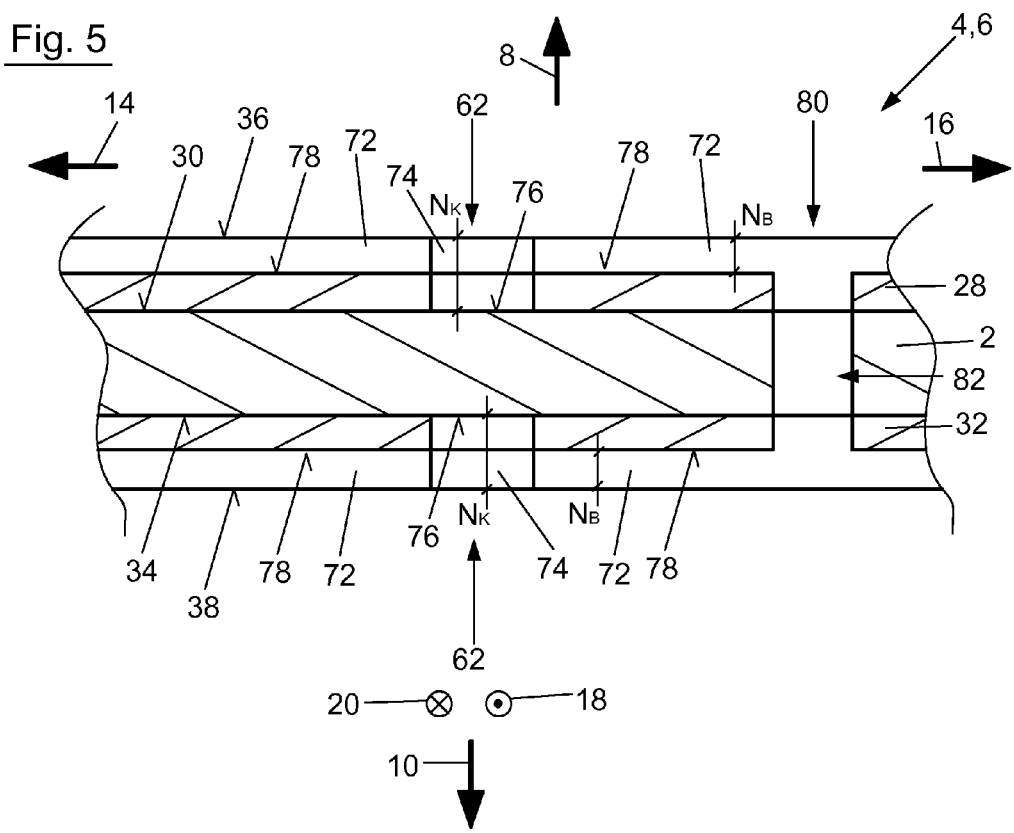
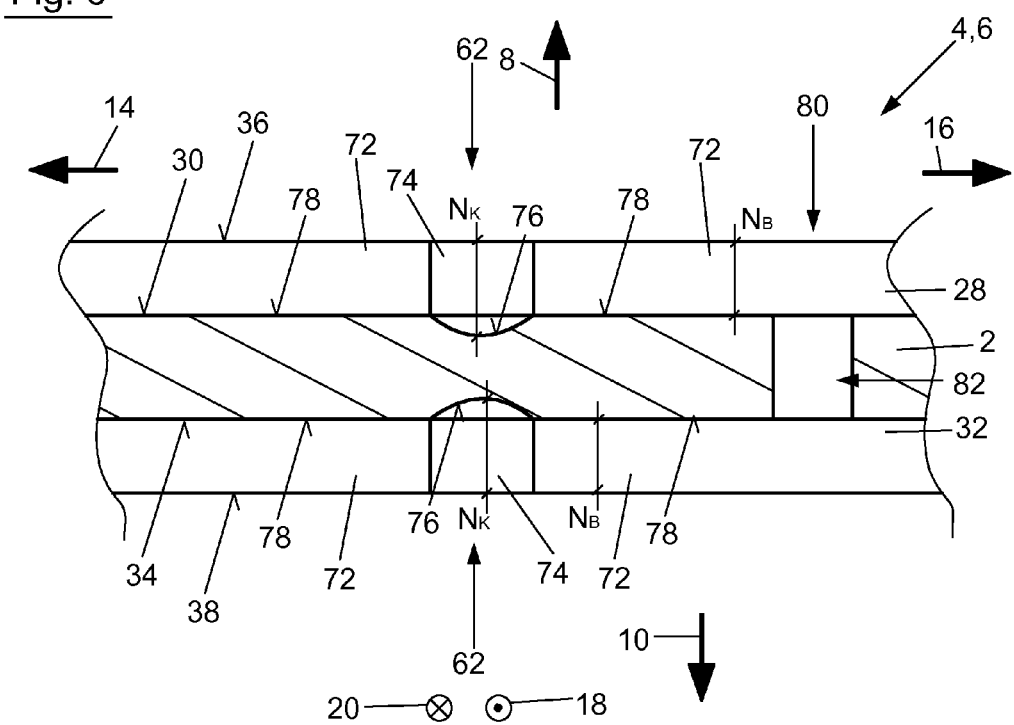

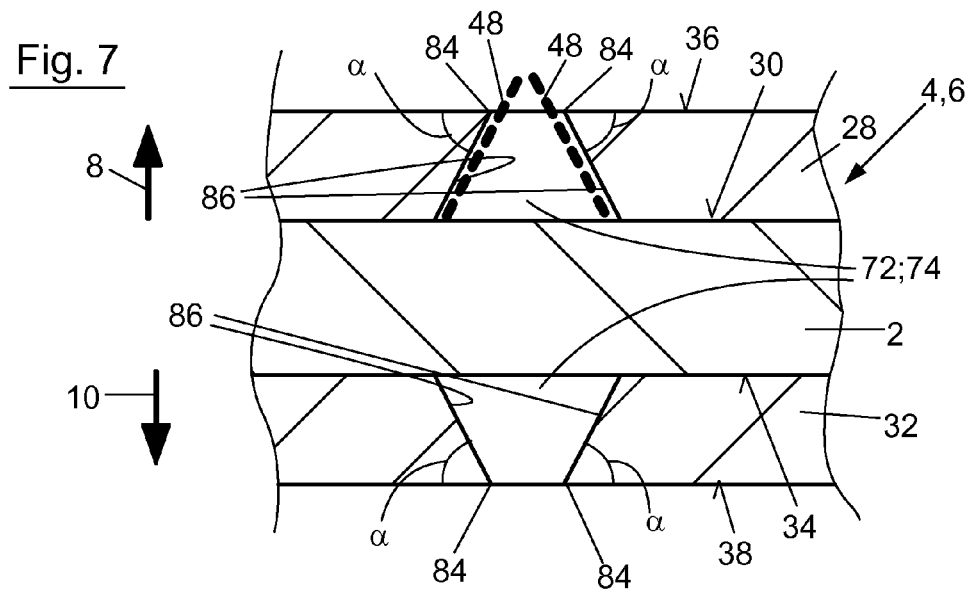

METHOD FOR PRODUCING A PATTERN OF DEPRESSIONS IN THE FRICTION SURFACE OF A FRICTION COMPONENT AND A FRICTION COMPONENT FOR A FRICTIONALLY OPERATING DEVICE HAVING SUCH A PATTERN OF DEPRESSIONS

CROSS-REFERENCE TO RELATED APPLICATIONS

This application claims the benefit of German Patent Application Serial No. 10 2011 106009.3 filed Jun. 30, 2011.

DESCRIPTION

The present invention relates to methods for producing a pattern of depressions in the friction surface of a friction component for a frictionally operating device. Moreover, the present invention relates to a friction component for a frictionally operating device, which component has a friction surface, in which a pattern of depressions is provided.

The prior art has disclosed friction plates for multiplate clutches which consist essentially of a friction facing carrier and a friction facing applied on one or both sides of the friction facing carrier. The side of the friction facing which faces away from the friction facing carrier forms the friction surface of the friction plate. Particularly in wet multiplate clutches, use is made of friction plates in the friction surfaces of which depressions or grooves are provided in order to exert a positive effect on the friction behavior, service life and drag torque behavior of the friction plates.

In order to obtain the pattern of depressions or grooves mentioned, various methods are used in practice. Thus, mention may be made first of all in this context of the stamping of the friction facing. In this traditional forming method, a die bearing the negative shape of the pattern of depressions or grooves is pressed against the friction facing in order to obtain corresponding depressions or grooves within the friction surface of the friction facing. However, stamping has the disadvantage that the groove depths which can be achieved are not particularly great. Moreover, the die required to stamp a complex pattern of depressions or grooves is expensive to produce, and therefore stamping can only be carried out with a relatively large amount of effort and relatively high costs. Moreover, although no accumulation of material is formed at the groove edge when stamping, it has been found that the groove edge is rounded by the stamping process, and therefore it is not possible to produce an angular groove edge precisely or accurately by means of the stamping process. Thus, stamping does not allow the shape of the groove edge to be precisely predetermined, and therefore it is also not possible to predict the subsequent behavior of the friction plate during use within the multiplate clutch with the desired precision.

Apart from the forming method of stamping, use is currently also being made of traditional cutting methods, namely milling and grinding, for the production of patterns of depressions and grooves in the friction surface of a friction plate. Of the two methods mentioned, grinding cannot be carried out economically, and therefore it plays a subordinate role nowadays. Milling, in contrast, is being given increased prominence, even if the depressions or grooves in a pattern of depressions or grooves produced by milling are subject to severe fluctuations in respect of the groove depth. Moreover, milling leads to a relatively severe accumulation of material at the groove edge, and this can affect the behavior of the friction plate during operation within the multiplate clutch. Thus, for example, this accumulation of material can be abraded during operation, leading to contamination of the cooling or lubricating oil. Moreover, the accumulation of material can be forced downward into the adjacent groove, where it changes the groove cross section and thus, in turn, the behavior of the friction plate during the operation of the multiplate clutch. If the friction facing is a paper friction facing, this furthermore leads to fraying in the region of the milled portions, and this can likewise lead to contamination and to an effect on operational behavior. Moreover, although it is possible to achieve a greater groove depth by milling than with stamping, it is not possible to achieve a maximum groove depth corresponding to the thickness of the friction facing here either, especially since, in this case, there would be contact between the tool and the friction facing carrier, which can lead to wear on the tool or unwanted removal of material from the friction facing carrier. Since, even with milling for the production of grooves or depressions, relatively expensive milling tools, such as end milling cutters, have to be used, this method too can be used economically only to a limited extent.

It is therefore an object of the present invention to indicate a method for producing a pattern of depressions in the friction surface of a friction component for a frictionally operating device, by means of which a friction component can be manufactured with an accuracy such that the behavior thereof when used in a frictionally operating device can be reliably predicted. The present invention is furthermore based on the object of providing a friction component for a frictionally operating device which, when used in a frictionally operating device, exhibits reliably predictable behavior and prevents contamination of the frictionally operating device.

This object is achieved by the features indicated in patent claims 1 and 9. Advantageous embodiments of the invention are the subject matter of the dependent claims.

The method according to the invention is used to produce a pattern of depressions in the friction surface of a friction component for a frictionally operating device. The pattern of depressions is preferably a groove pattern, in which the depressions are therefore of elongate design. The frictionally operating device is preferably a multiplate clutch or brake, particularly preferably a wet multiplate clutch or multiplate brake. In one method step of the method according to the invention, a friction component with a friction surface is prepared. The friction component is preferably a "friction plate", which can be used, for example, in one of the above-mentioned frictionally operating devices, that is to say, for example, a multiplate clutch or brake. In this embodiment, it is furthermore particularly preferred if the friction component is a friction plate having a friction facing which is applied to a friction facing carrier, this then being a friction facing applied to the friction facing carrier in a preceding method step to produce the friction surface. Thus, for example, the side of the friction facing which faces away from the friction facing carrier can form the friction surface of the friction component consisting of the friction facing carrier and the friction facing. In the preceding method step mentioned, the friction facing is preferably adhesively bonded to the friction facing carrier. Once the friction component has been prepared, the pattern of depressions, preferably the groove pattern, is then produced, this being accomplished, according to the invention, by nontraditional material removal. The term "nontraditional material removal" is intended here to mean the separation of particles of material from a solid body, in this case the friction facing, without a mechanical action. Thus, for example, the pattern of depressions or grooves can be produced by thermal, chemical or electrochemical removal of material. Since the separation of the particles of material from the friction facing during nontraditional material removal takes place without a mechanical action, the progress of the method is independent of the mechanical properties of the friction component, that is to say, for example, of the friction facing and of the friction facing carrier. Whereas the mechanical properties of the material of the friction component can cause severe fluctuations in respect of the depth of the depressions or grooves in the case where the depressions or grooves are milled, they play a negligible role during nontraditional material removal, i.e. when separating particles of material without a mechanical action. On the contrary, a relatively large and constant depth of the depressions and grooves is achieved by nontraditional material removal.

In order to eliminate an involved cleaning operation on the friction component after the production of the pattern of depressions by nontraditional material removal, the pattern of depressions or groove pattern is produced by contactless material removal in a preferred embodiment of the method according to the invention. This contactless material removal may include spark erosion or removal by laser cutting, for example.

In a particularly preferred embodiment of the method according to the invention, the pattern of depressions or groove pattern is produced by means of a laser beam. Removal of material with the aid of a laser beam has proven itself to be the best of all nontraditional material removal methods. Thus, not only is it possible, with the aid of the laser beam, to achieve a particularly great depth of the depressions or grooves in the pattern of depressions or grooves, it has also been found that a groove edge can be produced in a particularly accurate manner with the aid of the laser beam without pronounced rounding of the groove edge, as would arise, for example, in the case of stamping, or the formation of an accumulation of material projecting beyond the friction surface in the region of the groove edge, as is the case especially with milling. Owing to the particular accuracy with which the edge of the depression or groove can be produced, it is also possible to provide a relatively accurate prediction of the subsequent behavior of the friction component during use within the frictionally operating device. Moreover, when using a friction component according to this embodiment, contamination of the frictionally operating device can be largely avoided, especially since no accumulation of material occurs at the groove edges, which could be abraded during operation or could be forced into the adjacent depression or groove, where it would furthermore have a negative effect on the behavior of the friction component. In addition, this embodiment of the method according to the invention can be carried out relatively economically, especially since it is possible to dispense with expensive tools, such as stamping dies or end milling cutters, which are moreover particularly susceptible to wear.

In another preferred embodiment of the method according to the invention, a solid-state laser beam, preferably an Nd:YAG laser beam, or a gas laser beam, preferably a $CO_2$ laser beam, is used to produce the pattern of depressions or grooves. In this embodiment, the solid-state laser beam or the Nd:YAG laser beam has proven particularly suitable, especially since more flexible control, alignment or tilting was possible in order to achieve maximum freedom in the design of the depressions or grooves.

In another particularly preferred embodiment of the method according to the invention, a paper friction facing is applied as a friction facing to the friction facing carrier and is preferably adhesively bonded to the latter. The abovementioned advantages of contactless material removal are particularly pronounced with a paper friction facing, especially since a particularly great depth of the depressions or grooves can be achieved, this depth furthermore being subject to only very slight fluctuations. Moreover, no accumulation of material occurs in the region of the groove edge. Furthermore, it has not been possible to detect any fraying of the paper friction facing, which would not only have a negative effect on the operating behavior of the friction component but could also significantly shorten the service life thereof, especially since this could lead to further tearing of the paper friction facing. Of all the contactless material removal methods, contactless material removal by means of a laser beam has achieved the best results in respect of the depth of the depressions or grooves and of the geometry of the depression and groove edges when using a paper friction facing. Moreover, in the case of contactless material removal by means of a laser beam, it was not possible to detect any fraying on the paper friction facing in the region of the cutting location.

In an advantageous embodiment of the method according to the invention, the focal point of the laser beam and the friction component perform a movement relative to one another. The term "focal point" in the sense in which it is used in the present invention does not necessarily have the strictly physical meaning of the term "focal point", but is intended here to refer essentially to that area of the friction component upon which the laser beam impinges. Moreover, the term "relative movement" makes it clear that it is first of all unimportant whether the focal point of the laser beam is arranged at a fixed location while the friction component actually moves or whether the friction component is arranged at a fixed location, while the focal point of the laser beam actually moves. In addition, it is likewise possible in this context for neither the focal point nor the friction component to be arranged at a fixed location, with the result that both the focal point and the friction component are actually or actively moved. However, since the tilting or alignment of the laser beam makes it possible to exert a specifically intended effect on the geometry of the depression or groove without the need for any major outlay, it is preferred in this embodiment if the focal point or the laser beam alone or at least additionally is actively moved or driven. In this embodiment, the relative movement between the focal point of the laser beam and the friction component means that the focal point is guided over the friction surface of the friction component along at least one path, thus allowing a groove of the groove pattern to be produced.

In a preferred embodiment of the method according to the invention, the focal point is guided over the friction surface along a path which deviates from a straight line. Here, the advantages of contactless material removal by means of a laser beam over production of grooves by milling are particularly clear. Whereas milling along a path which deviates from a straight line is relatively time-consuming, purely owing to the inertia of the milling head, contactless material removal by means of a laser beam in the region of the focal point of the laser beam can be carried out particularly quickly, especially since the laser beam can be controlled in a particularly quick and simple manner with the aid of a mobile mirror system or the like in order to guide the focal point along the path which deviates from a straight line. In this embodiment, it is furthermore preferred if the path which deviates from a straight line is arcuate, curved or spiral in shape. Moreover, the advantages of contactless material removal by means of a laser beam are particularly pronounced if the path which deviates from a straight line has a continuous progression, as is furthermore preferred in this embodiment.

In another particularly preferred embodiment of the method according to the invention, the focal point of the laser beam is guided along at least two paths, which intersect at an intersection point. Owing to the fact that the focal point or laser beam acts twice as frequently on the friction component or friction facing at the intersection point of the two paths as at the other points along the respective path, a greater groove depth necessarily arises at the intersection point than in the other regions along the two paths, without the need for a complex control system for this purpose. Whereas an end milling cutter, for example, would have to be deliberately driven deeper into the material of the friction component or friction facing in the region of the intersection point, the focal point or laser beam simply has to be guided along the two paths in order to achieve the same result. In this context, it may be noted that a greater groove depth in the region of the intersection point of the two paths is advantageous in respect of the cooling and lubrication behavior of a cooling and lubricating fluid within the grooves, and therefore the cooling and lubrication of the friction component are improved in this embodiment.

In another advantageous embodiment of the method according to the invention, one of the paths ends at the intersection point. This makes it clear that the two paths do not necessarily have to intersect in the conventional sense; on the contrary, a greater groove depth is achieved at the intersection point in this case too, with the abovementioned advantages.

In order to be able to achieve the different groove depths in the region of the intersection point without additional control of the speed of the focal point along the paths, the power of the laser beam or the like, the focal point of the laser beam is, in another advantageous embodiment of the method according to the invention, guided with a constant power of the laser beam, at least in the path sections adjoining the intersection point. As already indicated above, it is thereby possible, without further specific control, to achieve a greater groove depth in the region of the intersection point, with this groove depth being approximately twice as great as the groove depth in the path sections adjoining the intersection point.

In a particularly advantageous embodiment of the method according to the invention, the laser beam, which has a constant power in the path sections adjoining the intersection point, and the friction facing are matched to one another in such a way that the friction facing is completely removed by the laser beam at the intersection point but only partially removed in the path sections adjoining the intersection point. This aim can be achieved, for example, by matching the speed of the focal point along the paths to the material of the friction facing used.

In another preferred embodiment of the method according to the invention, the power of the laser beam is modified while the focal point is being guided over the friction surface along the path. By varying the power of the laser beam, it is thus a simple matter to vary the groove depth of a groove to be produced along the path in order to exert a specific effect on the behavior of the friction component in various areas without this necessitating the complex and time-consuming process of readjusting a tool, such as an end milling cutter.

According to another preferred embodiment of the method according to the invention, the size of the focal point is modified while the focal point is being guided over the friction surface along the path. In this way, the width of the groove to be produced along the path can be varied in a particularly simple manner in order to exert a specific effect on the friction and lubrication behavior of the friction component in different areas. In this case, there is no need for a complex control system; on the contrary, the size of the focal point can be modified in a relatively simple manner by means of an optical system associated with the laser beam. Consequently, in this embodiment of the method according to the invention too, contactless material removal by means of a laser beam is significantly superior to cutting by means of a milling cutter, especially since the dimensions of the milling head cannot be changed, with the result that the same milling head would have to be used several times in this region of the path in order to achieve a corresponding width of the groove to be produced. This makes milling significantly more time-consuming than the method according to the invention in this embodiment.

In another particularly advantageous embodiment of the method according to the invention, the groove depth of the groove pattern groove to be produced along the path is advantageously varied by modifying the speed of the focal point along the path while the focal point is being guided over the friction surface. Here too, there is no need for readjustment of a tool, such as a milling tool, especially since the laser beam automatically achieves a greater groove depth in the friction component or friction facing if it remains at one location for longer than at other locations. Thus, the use of a laser beam for contactless material removal allows the groove pattern to be produced in the friction surface of the friction component in a particularly simple and rapid manner in this case too.

In the description given above, a number of methods have already been described, by means of which the groove depth of the groove to be produced along the path with the aid of the laser beam can be modified. In another advantageous embodiment of the method according to the invention, this is accomplished by guiding the focal point of the laser beam along the same path at least twice. This can be advantageous if a laser with a relatively low and constant power is used, for which reason it is preferred here if the laser beam has a constant power. Moreover, it is advantageous in this embodiment that the introduction of heat by the action of the laser beam on the friction component does not take place all at once but successively with one or more interruptions, thereby reducing any negative effect of the introduction of heat into the friction component. However, it should be noted that, in any case, the use of a laser beam for producing the grooves means that the friction component is less affected than is the case when the grooves are milled. In this embodiment, it is furthermore particularly preferred if the laser beam is guided two or more times along the same path with a modified tilt or alignment thereof relative to the friction component. Thus, during the first pass along the path, the laser beam can have a first tilt or alignment, by means of which the slope of a first groove flank can be produced in a targeted manner, while, during the second pass along the path, the laser beam can have a second tilt or alignment relative to the friction component, by means of which the tilt of the opposite, second groove flank of the groove to be produced can be produced in a targeted manner. From this, it is apparent that the use of a laser beam for producing the grooves of the groove pattern allows particularly flexible configuration not only of the groove depth but also of the groove flanks, including, for example, a groove flank which encloses an angle of less than 90° with the friction surface, as will be explained in greater detail below.

In another advantageous embodiment of the method according to the invention, the laser beam for producing the pattern of depressions or grooves is furthermore used for removing material from and/or cutting the friction facing carrier. In other words, in this embodiment, the method steps which are usually carried out separately, which furthermore rendered cross-transfer necessary, follow directly upon one another since the same process, namely material removal or cutting by means of a laser beam, is also used to modify the friction facing carrier. It is preferred here if this is performed on the same machining station.

In another preferred embodiment of the method according to the invention, at least one through hole is produced within the friction component with the aid of the laser beam. As already indicated with reference to the embodiment described above, the laser beam thus not only assumes the role of producing a groove pattern here; in addition, the friction component is further modified by producing the through hole with the aid of the laser beam inasmuch as a pressure equalization can take place between the opposite sides of the friction component when the friction component is used within a frictionally operating device. It is thus possible to exert a positive effect on the lubrication and friction behavior of the friction component without the need for an additional method step on an additional or different machining station. In this embodiment, it is furthermore preferred if the through hole is produced at one point along one of the paths, something which can be achieved without much effort by briefly halting or slowing down the focal point as it is moved along the path, for example.

In order to reduce the effort involved in applying the friction facing to the friction facing carrier, the friction facing in another particularly advantageous embodiment of the method according to the invention is cut with the aid of the laser beam to produce the outer and/or inner edge of the friction facing. Since the outer and/or inner edge of the friction facing in this embodiment is thus produced only after the friction facing has already been applied to the friction facing carrier, there is no need for an involved and precise positioning process for the friction facing during the preceding application thereof. Instead, the friction facing can have an overhang which can be cut off with the aid of the laser beam. Thus, it is furthermore preferred in this embodiment if the friction facing is cut to remove an overhang of the friction facing beyond the outer and/or inner edge of the friction facing carrier with the aid of the laser beam. In order to counteract severe wear on the friction facing at the outer and/or inner edge thereof, especially fraying of the friction facing if a paper friction facing is used, it is furthermore preferred in this embodiment if the friction facing is cut to produce a chamfer or bevel on the outer and/or inner edge of the friction facing with the aid of the laser beam. In this embodiment, it is furthermore preferred if the focal point is guided on an annular or circular path in order to cut the friction facing to produce the outer and/or inner edge of the friction facing.

As already indicated above, the tilt or alignment of the laser beam can be modified relatively easily by means of an optical system in order to allow flexible design of the grooves. In another preferred embodiment of the method according to the invention, the laser beam is tilted or aligned to produce a depression or groove edge which encloses an angle of less than 90°. This has the effect of producing a friction component, the friction surface of which is relatively large, despite a large holding capacity of the depressions or grooves. Such a relocation of parts of the depression or groove in the axial direction behind the friction surface is completely impossible with stamping and only with a significantly increased effort with milling, and the inaccuracy in milling caused by the mechanical properties of the friction component or friction facing can lead to a relatively unstable friction surface in the region of the groove edge. In this embodiment, it is furthermore preferred if the laser beam is tilted or aligned to produce a depression or groove edge which encloses an angle of less than 70° in order to produce a holding capacity of the depression or groove which has a significant effect on the behavior of the friction component within the frictionally operating device. However, it has furthermore been found that this angle should not be less than 45°, as is furthermore preferred in this embodiment, especially since the stability of the friction surface in the region of the groove edge can fall at smaller angles. In order to further enhance the abovementioned advantage of an angle of less than 90° enclosed by the depression or groove edge, the laser beam in this embodiment is particularly preferably tilted or aligned to produce a dovetail depression or groove cross section. Another possible way of expressing this is to say that the laser beam is tilted or aligned in such a way that both mutually opposite depression or groove edges enclose the abovementioned angle of less than 90°, preferably less than 70°. In order to obtain this dovetail shape of the depression or groove cross section, the focal point can, for example, be guided twice along the same path, with the two passes being carried out with a different tilt or alignment of the laser beam relative to the friction component, as already explained above with reference to a different embodiment of the method according to the invention.

The friction component according to the invention for a frictionally operating device has a friction surface in which a pattern of depressions producible or produced by the method according to the invention is provided. In this case, the friction component is preferably designed for a multiplate clutch or brake, particularly preferably for a wet multiplate clutch or brake. As already explained above with reference to the method according to the invention, the friction component is preferably a friction plate, particularly preferably a friction plate having a friction facing applied to a friction facing carrier and forming the friction surface, wherein the friction facing is preferably formed by a paper friction facing. The friction facing carrier, on the other hand, is preferably a metal friction facing carrier, particularly preferably a steel friction facing carrier, to which the paper friction facing is preferably adhesively bonded.

In a preferred embodiment of the friction component according to the invention, at least one groove of the groove pattern, preferably all the grooves, deviates from a straight line, particularly preferably having an arcuate, curved or spiral and, if appropriate, continuous progression.

According to another preferred embodiment of the friction component according to the invention, two grooves of the groove pattern intersect in the friction surface of the friction component at an intersection point, at which the groove depth is greater than in the groove sections adjoining the intersection point. It is thereby possible to achieve an improved cooling and lubrication behavior of the friction component. In this embodiment, it is preferred if one of the grooves ends at the intersection point, the two grooves thus forming a Y-shaped groove pattern, for example. It is furthermore preferred in this embodiment if the groove base of the grooves is formed by the friction facing, but is formed by the friction facing carrier at the intersection point. In this way, on the one hand, the cohesion of the friction facing is maintained in that region of the grooves in which the groove base is formed by the friction facing itself, while the maximum holding capacity for cooling or lubricating oil is created at the intersection point of the grooves, exhibiting a positive effect on the cooling and lubrication behavior of the friction component.

According to another particularly preferred embodiment of the friction component according to the invention, at least one groove of the groove pattern has a groove edge which encloses an angle of less than 90°, preferably less than 70°, wherein the depression or groove cross section of the groove particularly preferably has a dovetail shape. As already explained with reference to the method according to the invention, this creates a groove with a large holding capacity without excessively reducing the size of the friction surface. In order to avoid excessively limiting the stability of the friction facing, the angle enclosed by the groove edge is particularly preferably not less than 45°.

Figure 2:
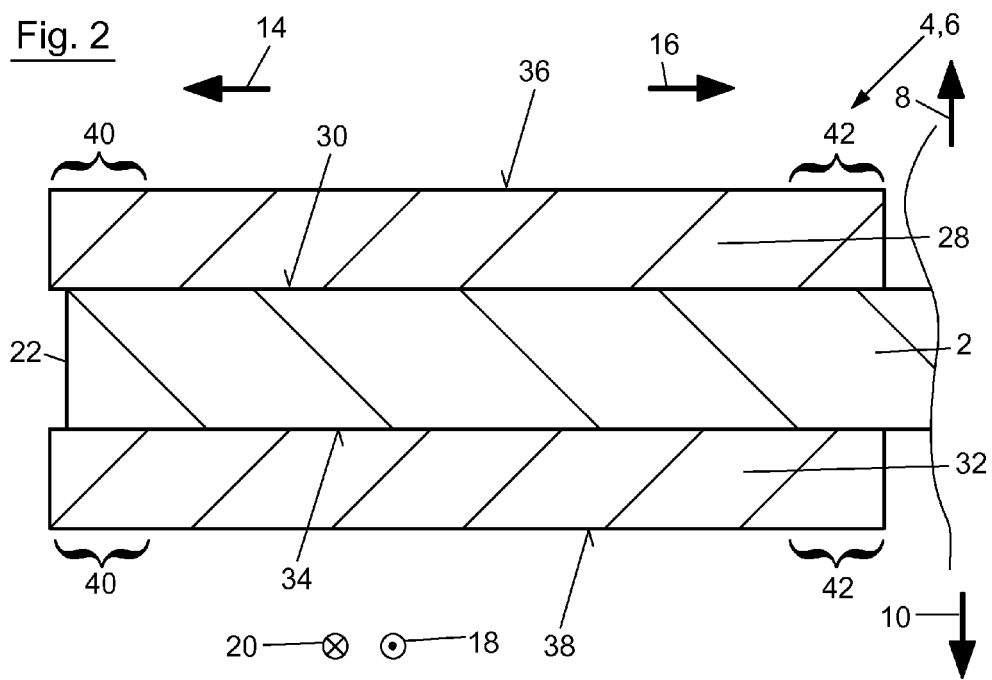
Figure 3:
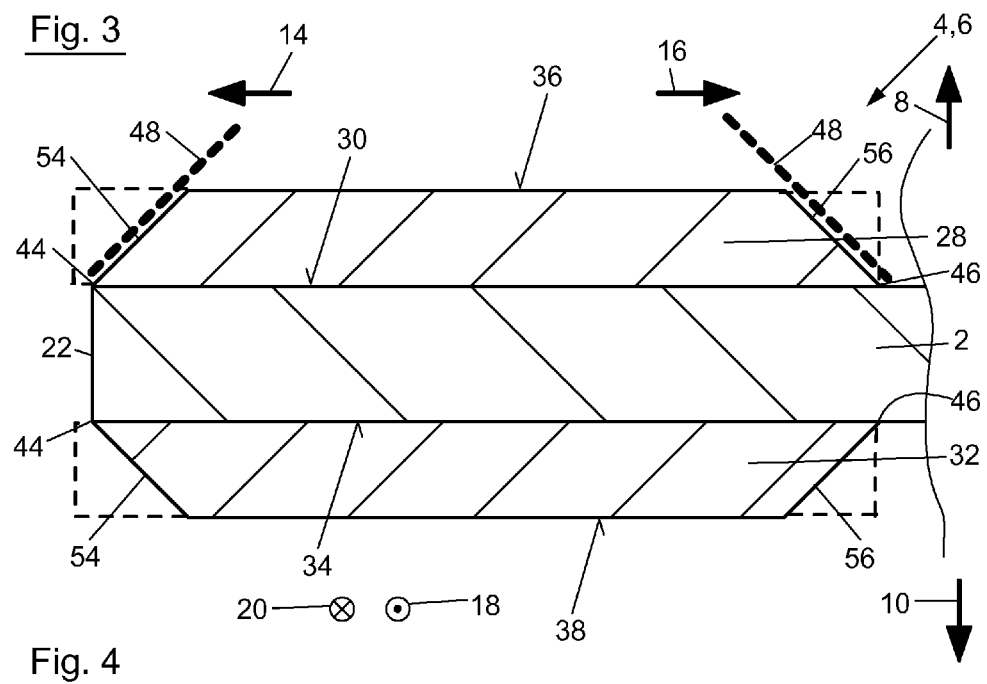
Figure 4:
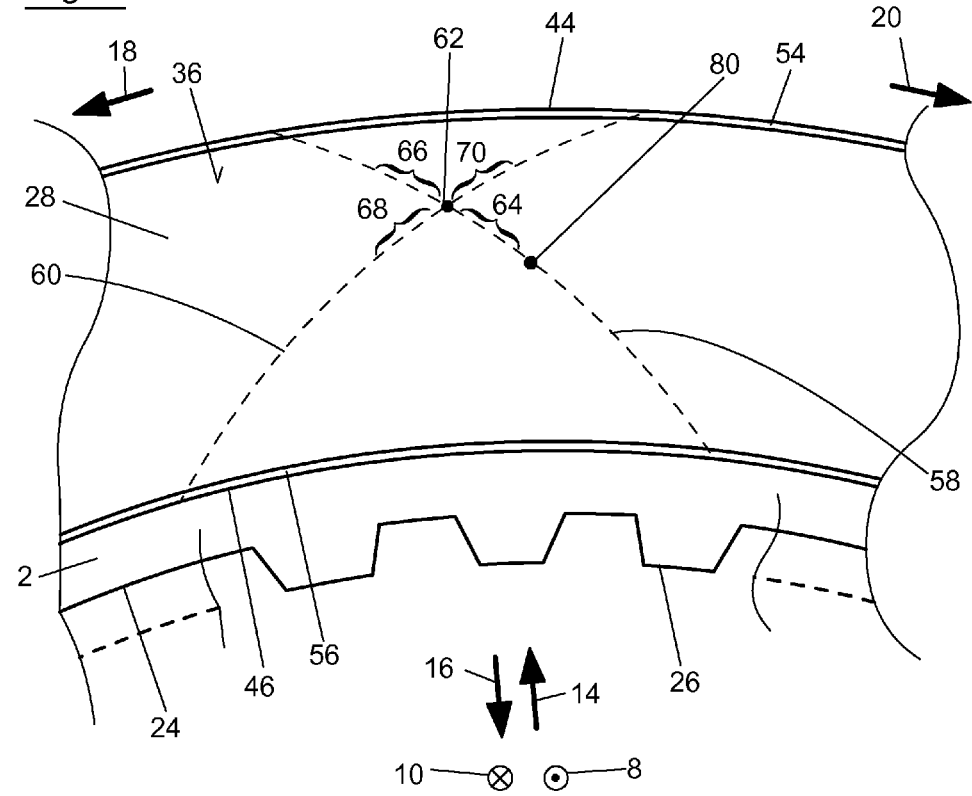

The invention is explained in greater detail below by means of illustrative embodiments with reference to the attached drawings, in which:

FIG. 1 shows a front view of a friction component after the application of the friction facing, FIG. 2 shows a sectional view along section line A-A in FIG. 1, FIG. 3 shows the sectional view of FIG. 2 after the friction facing has been cut with the aid of a laser beam, FIG. 4 shows a detail from FIG. 1 following the cutting of the friction facing with the aid of the laser beam to illustrate the paths along which the focal point of the laser beam is guided during the production of a groove pattern, FIG. 5 shows a sectional view along the first path in FIG. 4 after the production of the groove pattern with the aid of the laser beam, FIG. 6 shows a sectional view along the first path in FIG. 4 after the production of the groove pattern with the aid of the laser beam in accordance with a second variant of the method according to the invention, FIG. 7 shows a cross-sectional view of a variant embodiment of the grooves produced by the laser beam, FIG. 8 shows a longitudinally sectioned view of the grooves produced by a further variant embodiment of the method according to the invention, and FIG. 9 shows a plan view of a groove produced by another variant embodiment of the method according to the invention.

An embodiment of the method according to the invention will be explained below with reference to FIGS. 1 to 9.

Thus, first of all, the friction facing carrier 2 of a friction component 4 is prepared. The friction component 4 is preferably a friction plate 6 for a frictionally operating device, preferably a multiplate clutch or multiplate brake. The friction facing carrier 2 is substantially in the form of a circular disk or a ring and has an axis of rotation 12 extending in the two opposite axial directions 8, 10. Also indicated in FIG. 1, by means of corresponding arrows, are the mutually opposite radial directions 14, 16 and the two mutually opposite circumferential directions 18, 20 of the friction facing carrier 2 and hence of the entire friction component 4. The friction facing carrier 2, which is composed of metal, preferably of steel, has an outer edge 22 facing outward in radial direction 14 and an inner edge 24 facing inward in radial direction 16. Teeth 26 are formed on the inner edge 24, and the friction facing carrier 2 thus forms the basis for an inner plate. However, it should be noted that the friction component 4 or friction plate 6 could likewise be designed as an outer plate, in which case the teeth 26 would be provided on the outer edge 22.

After the preparation of the friction facing carrier 2, a friction facing, which is a paper friction facing 28 in this case, is applied to the front side 30 of the friction facing carrier 2, the side facing in axial direction 8, wherein the paper friction facing 28 is preferably adhesively bonded to the front side 30. In a corresponding fashion, another paper friction facing 32 is prepared and applied to the rear side 34 of the friction facing carrier 2, the side facing in axial direction 10, and, here too, the paper friction facing 32 is preferably adhesively bonded to the rear side 34 of the friction facing carrier 2. The friction plate 6 formed in this process is consequently a friction plate 6 provided on both sides with a friction facing. However, it should be noted that it could equally well be a friction plate 6 provided with a friction facing on only one side, in which case it would be possible to dispense with one of the two paper friction facings 28, 32. Since the structure of the two friction facings 28, 32 is substantially the same and the further processing thereof is substantially similar, the details given below apply primarily to paper friction facing 28, but the description applies in corresponding fashion also to paper friction facing 32.

Paper friction facing 28—like friction facing carrier 2—is substantially in the form of an annular or circular disk. Although the paper friction facing 28 illustrated in FIG. 1 is designed to be continuous in circumferential directions 18, 20, paper friction facing 28 can also be applied to the front side 30 in a number of segments, thus for example in annular disk segments. For reasons of clarity, however, paper friction facing 28 has not been shown in segmented form in FIG. 1. In all cases, paper friction facing 28 has a side facing away from the friction facing carrier 2, this side forming friction surface 36 of the friction component 4 or friction plate 6. Thus, paper friction facing 28 forms friction surface 36 of the friction component 4 or friction plate 6, the surface facing forward in axial direction 8, while paper friction facing 32 forms friction surface 38 of the friction component 4 or friction plate 6, the surface facing rearward in axial direction 10. In this arrangement, the friction surfaces 36 and 38 are preferably aligned parallel to the front and rear sides 30 and 34, respectively, of the friction facing carrier 2.

As can be seen, in particular, from FIG. 2, the friction surfaces 36 and 38 are of larger dimensions than is required in the mutually opposite radial directions 14, 16. Paper friction facing 28 thus has both an overhang 40 in the radially outward direction 14 and an overhang 42 in the radially inward direction 16. Overhang 40 even projects beyond the outer edge 22 of the friction facing carrier 2 in the radially outward direction 14. In order to remove the two overhangs 40, 42 and to create a precisely delineated friction surface 36, paper friction facing 28 is cut to produce the outer edge 44 and the inner edge 46 of paper friction facing 28 with the aid of a laser beam 48, which is indicated only schematically in FIG. 3. During this process, the focal point of the laser beam 48 is guided on an outer annular or circular path 50 in order to produce the outer edge 44 of the paper friction facing 28. In a corresponding fashion, the focal point of the laser beam 48 is guided on an inner annular or circular path 52 in order to create the inner edge 46 of the paper friction facing 28. The overhangs 40 and 42 are thereby removed. As is furthermore apparent from FIG. 3, the cutting off of the overhangs 40 and 42 follows, in each case producing a chamfer or bevel 54, 56 on the outer edge 44 and the inner edge 46, respectively, of paper friction facing 28, thereby enhancing the cohesion or stability thereof at the outer and inner edges 44, 46. The chamfer or bevel 54, 56 preferably tilts by 45°.

Now that the friction component 4 or friction plate 6 consisting of the friction facing carrier 2 and the paper friction facings 28, 32 has been prepared, a pattern of depressions, which is intended to be a groove pattern in the example under consideration, is produced in friction surface 36 of the paper friction facing 28, and this can be performed in a corresponding manner also in friction surface 38 of paper friction facing 32, as already indicated above. The procedure will be explained by way of example for part of the groove pattern to be produced with reference to FIGS. 4 and 5.

The groove pattern is produced by separating particles of material from paper friction facing 28 without a mechanical action, i.e. this is nontraditional material removal. Moreover, the material removal in the form illustrated should take place without contact and, in the embodiment illustrated, use is made for this purpose of the laser beam 48 which was previously used to cut paper friction facing 28 along the outer and inner paths 50, 52 in order to produce the outer and inner edges 44, 46 of paper friction facing 28. A solid-state laser beam, preferably an Nd:YAG laser beam, is used as laser beam 48. As an alternative, it would also be possible to use a gas laser beam, preferably a $CO_2$ laser beam, but the solid-state laser beam or Nd:YAG laser beam is preferred.

In order to produce the pattern mentioned, the focal point of the laser beam 48 and the friction component 4 or friction plate 6 perform a movement relative to one another. It is fundamentally irrelevant here whether the focal point of the laser beam 48 is of stationary design, while the friction component 4 is actively moved, whether the friction component 4 is of stationary design, while the focal point of the laser beam 48 is actively moved, or whether both the focal point of the laser beam 48 and the friction component 4 are actively moved. However, it is advantageous if at least the tilt or alignment of the laser beam 48 can be actively modified. By means of the relative movement mentioned, the focal point of the laser beam 48 is guided over friction surface 36 along at least two paths, namely along a first path 58 and along a second path 60, which are indicated in FIG. 4. Both paths 58, 60 deviate from a straight line, wherein the two paths 58, 60 are preferably of arcuate, curved or spiral design. It is furthermore apparent from FIG. 4 that the two paths 58, 60 each have a continuous progression. Moreover, the two paths 58, 60 intersect at an intersection point 62, wherein the first path 58 has two path sections 64 and 66 adjoining the intersection point 62, and the second path 60 has two path sections 68, 70 adjoining the intersection point 62. Although a conventional intersection between the two paths 58, 60 is shown in FIG. 4, it is likewise possible for one of the two paths 58 or 60 to end at the intersection point 62, and accordingly only three path sections adjoin the intersection point 62.

As can be seen from FIG. 5, a first groove 72 is thereby produced along the first path 58, while a second groove 74 is produced along the second path 60. Since the laser beam 48 acts twice as frequently on paper friction facing 28 or friction component 4 at the intersection point 62 as is the case in the path sections 64, 66, 68, 70 adjoining the intersection point 62, the groove depth $N_K$ achieved in the region of the intersection point 62 is greater than the groove depth $N_B$ in the path or groove sections 64, 66, 68, 70 adjoining the intersection point 62. In the variant embodiment shown in FIG. 5, the laser beam 48 has been controlled in such a way as to be operated at the same power in the path sections 64, 66, 68, 70 adjoining the intersection point 62. Moreover, the laser beam 48 with the same power in the path sections 64, 66, 68, 70 adjoining the intersection point 62 is matched to paper friction facing 32 in such a way that paper friction facing 28 is removed completely at the intersection point 62 but only partially in the path or groove sections 64, 66, 68, 70 adjoining the intersection point 62. In this way, the groove base 76 is formed by the front side 30 of the friction facing carrier 2 at the intersection point 62, while the groove base 78 is formed by a remainder of paper friction facing 28, at least in the corresponding groove sections 64, 66, 68, 70 of the grooves 72, 74. This has advantages in respect of the cohesion of paper friction facing 28 and, furthermore, the friction facing carrier 2 is, as a result, largely unaffected by the laser beam 48. However, it is also possible to achieve the maximum groove depth both at the intersection point 62 and in the first and second grooves 72, 74, with the result that the groove base 76 at the intersection point 62 and the groove base 78 in the first and second grooves 72, 74 is formed by the friction facing carrier 2, as indicated in FIG. 6. In this variant embodiment too, however, the groove depth $N_K$ achieved at the intersection point 62 is greater than the groove depth $N_B$ in the path or groove sections 64, 66, 68, 70 adjoining the intersection point 62, especially since the laser beam 48 in this variant embodiment brings about additional removal of material from the friction facing carrier 2 at the intersection point 62.

In both variant embodiments shown in FIGS. 5 and 6, the laser beam 48 is furthermore used to remove and/or cut the friction facing carrier 2 itself. As can be seen from FIG. 4 in conjunction with either FIG. 5 or 6, a through hole 82 is produced at a point 80 on the first path 58 with the aid of the laser beam 48, said hole extending in axial directions 8, 10 through the friction facing carrier 2 and the two paper friction facings 28, 32. If the laser beam 48 is supposed to have a constant power, this through hole 82 at point 80 can, for example, be produced by briefly halting or at least slowing down the focal point at point 80 during its movement along the first path 58, leaving enough time to cut the through hole 82 with the aid of the laser beam 48. As an alternative, it would of course also be possible to increase the power at point 80.

FIG. 7 illustrates another variant embodiment of the design of the grooves 72 or 74. Thus, here, the laser beam 48 is tilted or aligned to produce a depression or groove edge 84 which encloses an angle α of less than 90°, preferably less than 70°, particularly preferably, however, at least 45°. To be precise, the angle α of the groove edge 84 is in each case enclosed by friction surface 36 and the respective groove flank 86. Since, in the example under consideration, both mutually opposite groove flanks 86 are affected, the groove 72 or 74 has a dovetail depression or groove cross section. In this embodiment, it is advantageous if the focal point is guided at least twice along the same path, and this preferably takes place with a constant power of the laser beam 48. In order, in this process, to machine one groove flank 86 first and then the opposite groove flank 86, the laser beam 48 is initially guided along the path with a first tilt or alignment and then the laser beam 48 is guided along said path for a second time with a second tilt or alignment which is modified relative to the first tilt or alignment. In all cases, it is the tilt or alignment of the laser beam 48 in relation to the friction component 4 or friction plate 6 which is important.

FIG. 8 illustrates another variant embodiment for the production of the grooves 72 and 74 described above. Here, the power of the laser beam 48 is modified as the focal point is moved along the path 58, 60 in order to achieve a non-continuous change—here indicated for paper friction facing 28—or a continuous change—here indicated for paper friction facing 32—in the groove depth in the direction of extension of the respective grooves 72 and 74. As an alternative or supplementary measure, the change in the groove depth in the direction of extension of the grooves 72 and 74 can also be brought about by modifying the speed of the focal point along the paths 58 and 60. In regions of relatively low speed of the focal point, more material is consequently removed, and therefore a greater groove depth $N_B$ is achieved here than in regions in which the focal point is moved relatively quickly over friction surface 36.

FIG. 9 serves to illustrate another variant embodiment of the method for producing the grooves 72, 74, in which the groove width B measured transversely to the direction of extension of the grooves 72, 74 is modified. In this case, the size of the focal point, which is in each case indicated by dashes in FIG. 9, is modified while the focal point is being guided over friction surface 36 along paths 58 and 60. The groove width B thus varies in the direction of extension of grooves 72 and 74.

LIST OF REFERENCE SIGNS 2 friction facing carrier
4 friction component
6 friction plate
8 axial direction
10 axial direction
12 axis of rotation
14 radial direction
16 radial direction
18 circumferential direction
20 circumferential direction
22 outer edge
24 inner edge
26 teeth
28 paper friction facing
30 front side
32 paper friction facing
34 rear side
36 friction surface
38 friction surface
40 overhang
42 overhang
44 outer edge
46 inner edge
48 laser beam
50 outer path
52 inner path
54 chamfer or bevel
56 chamfer or bevel
58 first path
60 second path
62 intersection point
64 path section
66 path section
68 path section
70 path section
72 first groove
74 second groove
76 groove base
78 groove base
80 point
82 through hole
84 groove edge
86 groove flank
α angle
B groove width
$N_B$ groove depth
$N_K$ groove depth

The invention claimed is:

1. A method for producing a pattern of depressions, in a friction surface of a friction component for a frictionally operating device, comprising: producing a friction component having a friction surface, and creating a pattern of depressions by removing material from the friction component; wherein the removing material comprises directing a laser beam at a friction material, in which the focal point of the laser beam and the friction component perform a movement relative to one another, by means of which the focal point of the laser beam is guided over the friction surface along at least one path or wherein the focal point is guided over the friction surface along a path which deviates from a straight line, or is an arcuate, curved or spiral path; and wherein the focal point is guided along at least two paths which intersect at an intersection point, wherein one of the paths end at the intersection point and the focal point is guided with a constant power of the laser beam, at least in the path sections adjoining the intersection point wherein the laser beam, with the constant power in the path sections adjoining the intersection point and a friction facing are matched to one another in such a way that the friction facing is completely removed at the intersection point but only partially removed in the path sections adjoining the intersection point.

2. The method as set forth in claim 1, in which the power of the laser beam, the size of the focal point and the speed of the focal point along the path are modified while the focal point is being guided over the friction surface.

3. The method as set forth in claim 2, in which the focal point is guided along the same path at least twice, with a constant power of the laser beam with a modified tilt or alignment of the laser beam relative to the friction component.

4. The method as set forth in claim 3 in which the laser beam is furthermore used for removing material from and cutting a friction facing carrier and in which at least one through hole is produced in the friction component with the aid of the laser beam, wherein the through hole is produced at one point along one of the paths.

5. The method as set forth in claim 4 in which the friction facing is cut with the aid of the laser beam to produce the outer and inner edge of the friction facing, wherein this is accomplished by removing an overhang of the friction facing beyond the outer and inner edge of the friction facing carrier and by producing a chamfer or bevel on the outer and inner edge of the friction facing, and the focal point is guided on an annular or circular path.

6. The method as set forth in claim 5 in which the laser beam is tilted or aligned to produce a depression or groove edge which encloses an angle (α) of less than 90°, wherein the laser beam is tilted or aligned to produce a dovetail depression or groove cross section.

* * * * *